UNITED STATES PATENT OFFICE.

DANIEL J. GISH, OF HOPKINSVILLE, KENTUCKY, ASSIGNOR OF ONE-HALF HIS RIGHT TO HARRY B. GARNER, OF SAME PLACE.

IMPROVEMENT IN MEDICAL COMPOUNDS OR LINIMENTS.

Specification forming part of Letters Patent No. 140,698, dated July 8, 1873; application filed May 16, 1873.

*To all whom it may concern:*

Be it known that I, DANIEL J. GISH, of Hopkinsville, in the county of Christian and State of Kentucky, have invented certain new and useful Medical Compound called "Wild-Goose Liniment;" and do hereby declare the following to be a full, clear, and exact description of the same, its ingredients, manner of preparation, and use.

I first make a turpentine tincture by taking four pounds of best Cayenne pepper, two pounds of gum camphor, and four gallons of spirits of turpentine, which ingredients are placed in a suitable vessel that can be well corked and let them digest for two weeks in a temperature of about sun-heat, the vessel being shaken well every day. The mixture is then strained or filtered, forming the tincture. Coal-oil may be used in place of spirits of turpentine, but I prefer to use the turpentine. I then take of the whites of wild goose or hens' eggs one gallon, and of acetic acid one-half gallon. The albumen and acid are mixed well with wire switches or by other suitable means until it forms one body, care being taken that it does not froth much. To this add two or more gallons of the turpentine tincture. One gallon is well mixed first, then one pint of oil of sassafras is added, and then one gallon more of the turpentine tincture, and the whole well mixed.

If the mixture thickens in a bottle so as to make a fine body it is ready to be bottled for use. If it is too thick to pour into a vial add acetic acid until of the right consistency to pour into the vial. If it is not thick enough add more of the turpentine tincture.

I do not confine myself to the precise proportions of the ingredients mentioned, as they must necessarily be varied owing to the freshness of the eggs, the effect of the seasons upon the albumen, and for various other causes.

This liniment, which I call wild-goose liniment, is intended for the treatment of neuralgia, rheumatism, pain in the back or limbs, sprains, bruises, swellings, scrofulous tumors, sore throat, headaches, frost bites, and other kindred afflictions.

For animals it may be used for sprains, ring bone, spavin, splint, string-halt, or, in fact, almost any disease where a liniment can or should be applied externally.

It is to be applied to the part affected two or three times a day, and rubbed in with the hand with hard and rapid friction until it excites redness and a glow in the parts.

On beasts it is to be rubbed with a corn-cob or other firm substance.

Having thus fully described my invention, what I claim as new, and desire to secure by Letters Patent, is—

The within-described wild-goose liniment, consisting of the ingredients substantially as herein set forth.

In testimony whereof I have hereunto signed my name.

DANIEL J. GISH.

Witnesses:
JAMES M. GLASS,
R. R. DONALDSON.